(12) United States Patent
Chang et al.

(10) Patent No.: US 8,612,872 B2
(45) Date of Patent: Dec. 17, 2013

(54) ANIMATED USER INTERFACE CONTROL ELEMENTS

(75) Inventors: Albert Chang, Forestville (AU); Shane Gregory Stephens, Ryde (AU)

(73) Assignee: Canon Kabushiki Kaisha, Tokyo (JP)

( * ) Notice: Subject to any disclaimer, the term of this patent is extended or adjusted under 35 U.S.C. 154(b) by 1114 days.

(21) Appl. No.: 12/269,388

(22) Filed: Nov. 12, 2008

(65) Prior Publication Data

US 2009/0150813 A1     Jun. 11, 2009

(30) Foreign Application Priority Data

Dec. 5, 2007 (AU) ................................ 2007237356

(51) Int. Cl.
*G06F 3/048*     (2013.01)
(52) U.S. Cl.
USPC .......................................................... 715/764
(58) Field of Classification Search
USPC .......................................................... 715/764
See application file for complete search history.

(56) References Cited

U.S. PATENT DOCUMENTS

| | | | |
|---|---|---|---|
| 5,880,729 A | 3/1999 | Johnston, Jr. et al. | 715/823 |
| 2003/0052919 A1* | 3/2003 | Tlaskal et al. | 345/764 |
| 2007/0013699 A1 | 1/2007 | Nelson et al. | 345/473 |

* cited by examiner

*Primary Examiner* — Boris Pesin
*Assistant Examiner* — Angie Badawi
(74) *Attorney, Agent, or Firm* — Fitzpatrick, Cella, Harper & Scinto

(57) ABSTRACT

A method for providing an animated transition effect between a first display state associated with a first control state of a control element rendered on a graphical user interface of a computer system, and a second display state associated with a second control state of said control element is provided. The method renders the control element in said first state and then receives at the graphic user interface, a user input event to invoke the second control state of the control element. The method evaluates a graph associated with the control element, the graph having entries each corresponding to a state of the control element, each entry comprising an event, an associated transition and a destination state, to identify a graph entry specifying a transition invoked by the input event from a current displayed first state to the destination state, being the second control state. An entry is identified corresponding to the second control state as the current state of the control element and a description of an animation associated with the specified transition is retrieved. The animation is then rendered.

10 Claims, 10 Drawing Sheets

ANIMATED USER INTERFACE CONTROL ELEMENTS

CROSS-REFERENCE TO RELATED PATENT APPLICATIONS

This application claims the right of priority under 35 U.S.C. §119 based on Australian Patent Application No. 2007237356 filed Dec. 5, 2007, which is incorporated by reference herein in its entirety as if fully set forth herein.

TECHNICAL FIELD

The present invention relates to graphical user interfaces for computer systems. More specifically, the present invention provides a mechanism to provide animated control elements in user interfaces. Specifically the disclosure relates to the animating of graphical user-interface control elements in response to user input (or events) to thereby cause the control element to change state and, in turn, change the graphical appearance in a generally smooth manner.

BACKGROUND

In modern day computing, almost all software applications have a user-interface. Software application interfaces have evolved over the years, starting with console based interfaces in early machines, to user-interfaces which have graphical elements to represent control elements in the current modern times. Historically, the expectation on the interfaces to software applications has risen and the demand for highly attractive visual appearances continues to increase. A graphical control may be formed by an individual graphical element, or a combination of graphical elements, having a control function, sometimes called a widget. Where the combination results in an identifiable shape, the combination may be adjusted, such that, when adjusted combinations are displayed in sequence, such may result in an animation of the identifiable shape (eg. a graphical animal, such as a cat).

Control elements in user-interfaces traditionally have been pre-defined by various user-interface toolkits. Typically, building control elements is a difficult and mundane task that requires much code to correctly implement the desired behaviour. Graphical user-interfaces (GUIs) traditionally do not have much animation in them because the effort required to implement such animation has been considered additional effort in building the toolkits.

When animated control elements are required, additional effort is required to author the various animations that could occur. For example, in the situation of a three-state graphical button, the combinations of state changes that could occur are from normal to over state, over to down, down to normal, normal to down, over to normal, and down to over states. This would require the animation for all of the state changes to be defined to ensure that the controls will always animate between the different state change combinations.

Further, some state changes may need to be specified by a corresponding animation. In the present example, six separate animations may be required.

For control elements (eg. a GUI "button") that animate, multiple incoming events can cause the control to quickly change appearance. A naive approach to this circumstance would be to stop any current animation and then perform the new animation. This would result in the animations not animating smoothly since the first animation is stopped prematurely before the next animation is started. Another possible solution would be to discard events (or skip processing of events during animation), but this would cause logic for the GUI button to be skipped. An alternative method for handling such scenarios is to defer processing of events until the animation has completed. Such a solution would allow smooth animations, but would result in an unresponsive user-interface as the animation effects would occur some time after the actual event was generated, by a mouse click for example.

There are other solutions that solve the above problems which de-couple the animation from the event discrimination logic. On detecting user input invoking a change, the event is processed and the logic for the corresponding destination state is executed. Once logic has been performed, the animation is initiated by looking up the desired transition animation using the current visual state of the control element, and the current state. This allows the user interface to be responsive to input since unnecessary visual states of the controls are then skipped since the animation from the current visual state to the state of the current control element is always performed. While advantageous, such a solution is limiting as the animation performed is determined by the change in states, rather than the incoming events.

While the above issues make it difficult to build user-interfaces, one may take the approach of explicitly handling each animation with program code. Whilst this can work, it does result in widgets that are inflexible and difficult to customise and update the appearance.

SUMMARY

The present disclosure allows widgets to be created that are functionally correct, allow for transition animation to be easily defined, and for the visual appearance to be easily customisable.

In accordance with the present invention, a method is defined for providing an animated transition effect for a control element of a user-interface, whereby visual appearances are displayed for each state of the control element, and event processing is provided to respond to user input to provide an animated transition appearance for the control element.

In accordance with one aspect of the present disclosure there is provided a method for providing an animated transition effect between a first display state associated with a first functional state of a control element rendered on a graphical user interface of a computer system and a second display state associated with a second functional state of said control element, the method comprising:

rendering said control element in said first state;

receiving at said graphic user interface, a user input invoking said second functional state of said control element;

evaluating a graph associated with said control element, the graph having entries each of which comprising an event and the associated transition and destination state, to identify transition between a current displayed first state and the input event;

updating a current entry in the graph to refer to the previously identified graph entry;

retrieving a set of transition images of said control element;

repeatedly re-rendering control element; and rendering said control element in second display state.

According to another aspect of the present disclosure there is provided a method for providing an animated transition effect between a first display state associated with a first control state of a control element rendered on a graphical user interface of a computer system, and a second display state associated with a second control state of said control element, the method comprising:

rendering said control element in said first state;

receiving at said graphic user interface, a user input event to invoke said second control state of said control element;

evaluating a graph associated with said control element, the graph having entries each corresponding to a state of the control element, each entry comprising an event, an associated transition and a destination state, to identify a graph entry specifying a transition from a current displayed first state invoked by the input event to the destination state being the second control state;

identifying the entry corresponding to the second control state as the current state of the control element;

retrieving a description of an animation associated with the specified transition;

rendering the animation.

BRIEF DESCRIPTION OF THE DRAWINGS

At least one embodiment of the present invention will now be described with reference to the following drawings, in which.

DETAILED DESCRIPTION INCLUDING BEST MODE

Figure 1:
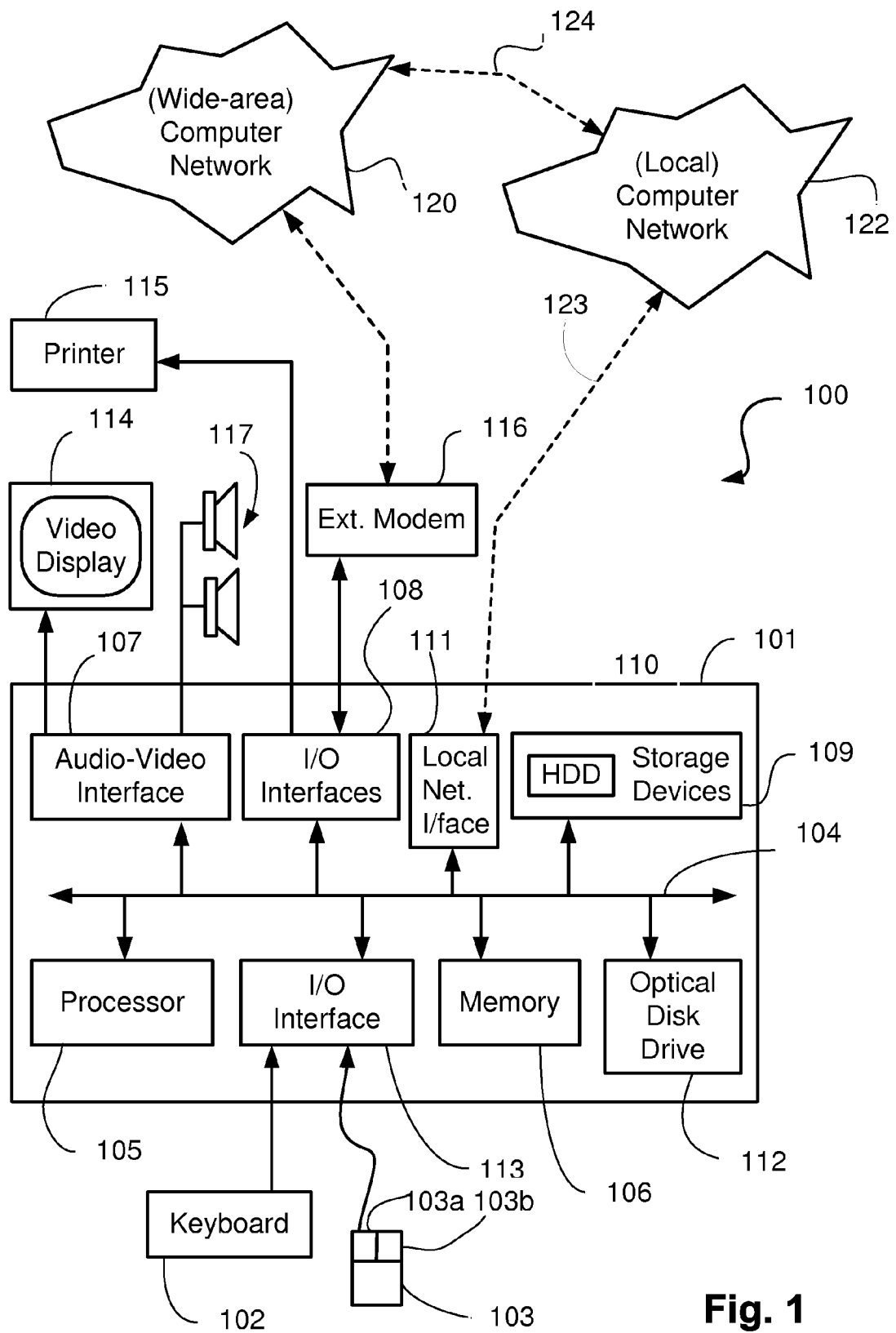
FIG. 1 is a schematic block diagram representation of a general purpose computer system in which the presently described arrangements may be practiced.
Figure 2:
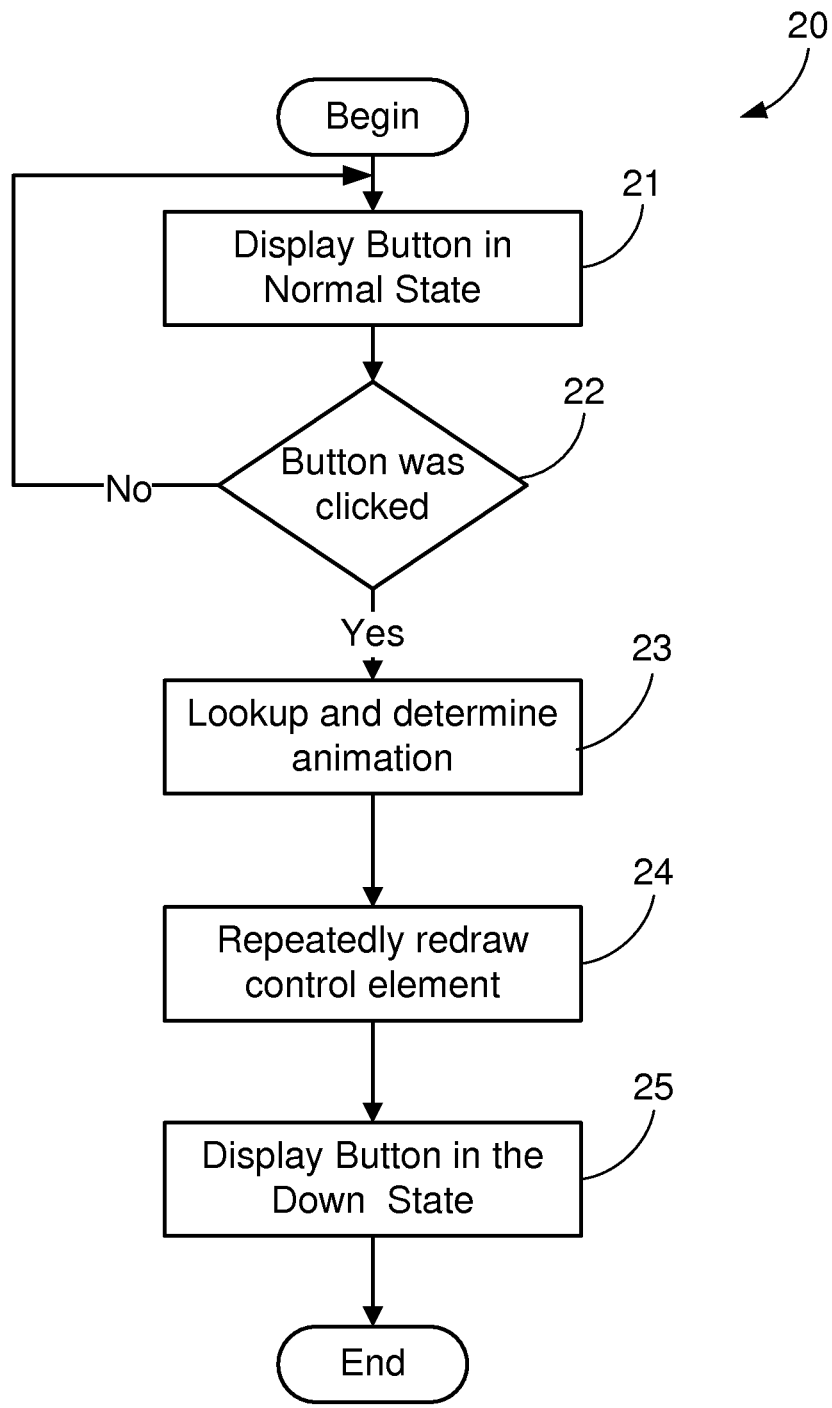
FIG. 2 is a flowchart used to describe an example of a control that is receiving interaction and being processed according to the present disclosure.

The methods of providing an animation transition disclosed herein may be implemented using a computer system 100, such as that shown in FIG. 1 wherein the processes of FIGS. 2-10 may be implemented as software, such as one or more application programs executable within the computer system 100. In particular, the steps of the methods of animated transitions are effected by instructions in the software that are carried out within the computer system 100. The instructions may be formed as one or more code modules, each for performing one or more particular tasks. The software may also be divided into two separate parts, in which a first part and the corresponding code modules perform the animation methods and a second part and the corresponding code modules manage a user interface between the first part and the user. In the present disclosure, these may be collectively referred to as a GUI. The software may be stored in a computer readable medium, including the storage devices described below, for example. The software is loaded into the computer system 100 from the computer readable medium, and then executed by the computer system 100. A computer readable medium having such software or computer program recorded on it is a computer program product. The use of the computer program product in the computer system 100 preferably effects an advantageous apparatus for animating transitions in a GUI.

As seen in FIG. 1, the computer system 100 is formed by a computer module 101, input devices such as a keyboard 102 and a mouse pointer device 103 having mechanical buttons 103a and 103b, and output devices including a printer 115, a display device 114 and loudspeakers 117. An external Modulator-Demodulator (Modem) transceiver device 116 may be used by the computer module 101 for communicating to and from a communications network 120 via a connection 121. The network 120 may be a wide-area network (WAN), such as the Internet or a private WAN. Where the connection 121 is a telephone line, the modem 116 may be a traditional "dial-up" modem. Alternatively, where the connection 121 is a high capacity (eg: cable) connection, the modem 116 may be a broadband modem. A wireless modem may also be used for wireless connection to the network 120.

The computer module 101 typically includes at least one processor unit 105, and a memory unit 106 for example formed from semiconductor random access memory (RAM) and read only memory (ROM). The module 101 also includes an number of input/output (I/O) interfaces including an audio-video interface 107 that couples to the video display 114 and loudspeakers 117, an I/O interface 113 for the keyboard 102 and mouse 103 and optionally a joystick (not illustrated), and an interface 108 for the external modem 116 and printer 115. In some implementations, the modem 116 may be incorporated within the computer module 101, for example within the interface 108. The computer module 101 also has a local network interface 111 which, via a connection 123, permits coupling of the computer system 100 to a local computer network 122, known as a Local Area Network (LAN). As also illustrated, the local network 122 may also couple to the wide network 120 via a connection 124, which would typically include a so-called "firewall" device or similar functionality. The interface 111 may be formed by an Ethernet™ circuit card, a wireless Bluetooth™ or an IEEE 802.11 wireless arrangement.

The interfaces 108 and 113 may afford both serial and parallel connectivity, the former typically being implemented according to the Universal Serial Bus (USB) standards and having corresponding USB connectors (not illustrated). Storage devices 109 are provided and typically include a hard disk drive (HDD) 110. Other devices such as a floppy disk drive and a magnetic tape drive (not illustrated) may also be used. An optical disk drive 112 is typically provided to act as a non-volatile source of data, Portable memory devices, such optical disks (eg: CD-ROM, DVD), USB-RAM, and floppy disks for example may then be used as appropriate sources of data to the system 100.

The components 105 to 113 of the computer module 101 typically communicate via an interconnected bus 104 and in a manner which results in a conventional mode of operation of the computer system 100 known to those in the relevant art. Examples of computers on which the described arrangements can be practised include IBM-PC's and compatibles, Sun Sparcstations, Apple Mac or alike computer systems evolved therefrom.

Typically, the application programs discussed above are resident on the hard disk drive 110 and read and controlled in execution by the processor 105. Intermediate storage of such programs and any data fetched from the networks 120 and 122 may be accomplished using the semiconductor memory 106, possibly in concert with the hard disk drive 110. In some instances, the application programs may be supplied to the user encoded on one or more CD-ROM and read via the corresponding drive 112, or alternatively may be read by the user from the networks 120 or 122. Still further, the software can also be loaded into the computer system 100 from other computer readable media. Computer readable storage media refers to any non-transitory, tangible, storage medium that participates in providing instructions and/or data to the computer system 100 for execution and/or processing. Examples of such media include floppy disks, magnetic tape, CD-ROM, a hard disk drive, a ROM or integrated circuit, a magneto-optical disk, or a computer readable card such as a PCMCIA card and the like, whether or not such devices are internal or external of the computer module 101. Examples of transitory or intangible computer readable transmission media that may also participate in the provision of instructions and/or data include radio or infra-red transmission channels as well as a network connection to another computer or networked device, and the Internet or Intranets including e-mail transmissions and information recorded on Websites and the like.

The second part of the application programs and the corresponding code modules mentioned above may be executed to implement one or more graphical user interfaces (GUIs) to be rendered or otherwise represented upon the display 114. Through manipulation of the keyboard 102 and the mouse 103, a user of the computer system 100 and the application may manipulate the interface to provide controlling commands and/or input to the applications associated with the GUI(s). In response to those controlling commands, the GUI may then be animated.

Figure 10:
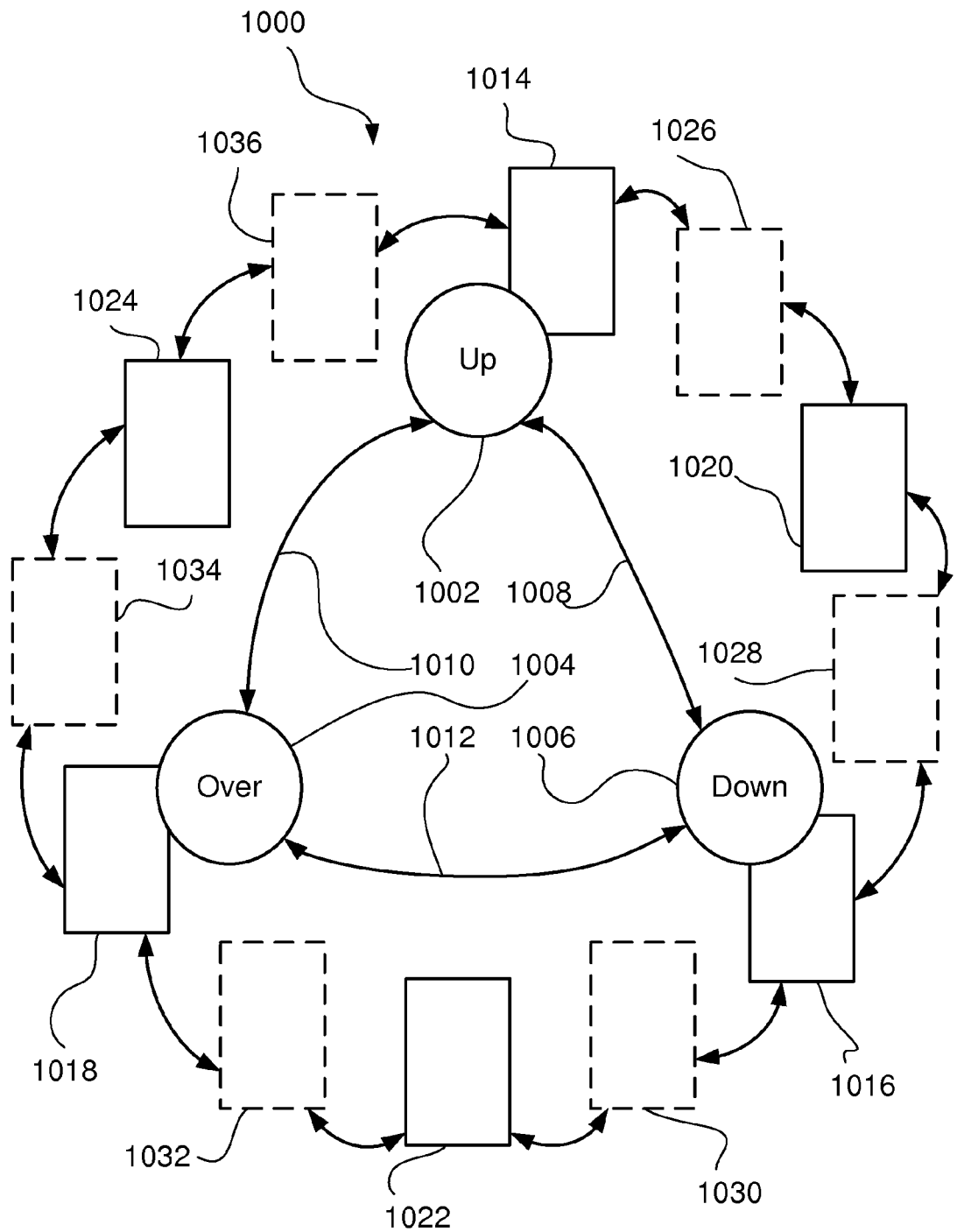
FIG. 10 is a schematic representation of a relationship between control states and animation nodes that may be experienced in an exemplary widget implementation.

User interfaces utilising screen control elements (often called widgets) can be modelled using a finite state machine, which in this document is simply called a state-machine. FIG. 10 represents various states for an exemplary widget 1000 which may form part of GUI. The widget 1000 has three control states 1002, 1004 and 1006, named Up, Over (or hover) and Down respectively and which correspond to user input events that invoke a change of state. The widget 1000 is able to change control state via transitions 1008, 1010 and 1012 linking the control states 1002, 1004 and 1006. Associated with each control state is a corresponding image representation 1014, 1016 and 1018 respectively. The representations 1014, 1016 and 1018 may be considered as source or destination key images for animation functions to be rendered to the display 114 as part of the operation of the widget 1000 within a GUI. The representations 1014, 1016 and 1018 further correspond to animation nodes, as that term is used herein. Associated with each transition 1008, 1010 and 1012 is a corresponding animation function where the representations 1014, 1016 and 1018 may be considered source or destination animation nodes. In this particular example, each animation function has an associated intermediate (key image) representation 1020, 1022 and 1024. Between each intermediate representation 1020, 1022 and 1024 and the adjacent source/destination representation 1014, 1016 and 1018 is a non-key or single interpolated representation 1026, 1028, 1030, 1032, 1034 and 1036, which may be formed by interpolating between the adjacent (key) representations. Implementation of each animation transition may, for example, consume say 0.8 seconds, where the source, intermediate and interpolated representations are each displayed in order for 0.2 seconds prior to the destination representation being displayed to conclude the animation. The animation function may vary in different implementations or for different changes of state.

It will be appreciated from FIG. 10 that during relatively slow operation of the GUI of the system 100, manipulation of the mouse 103 in association with the widget 1000 will provide for a smooth animated representation of any changes of state. Where however, user operations are rapid and exceed the rate at which the animated transitions are configured for reproduction (eg. by the user furiously clicking on the widget icon), it will be appreciated that the reproduction rate of the animations will conflict with the actual changes of state of the widget 1000. Whilst FIG. 10 show an example of a single control widget having three states, the following description focuses on a simpler two state example.

Figure 8:
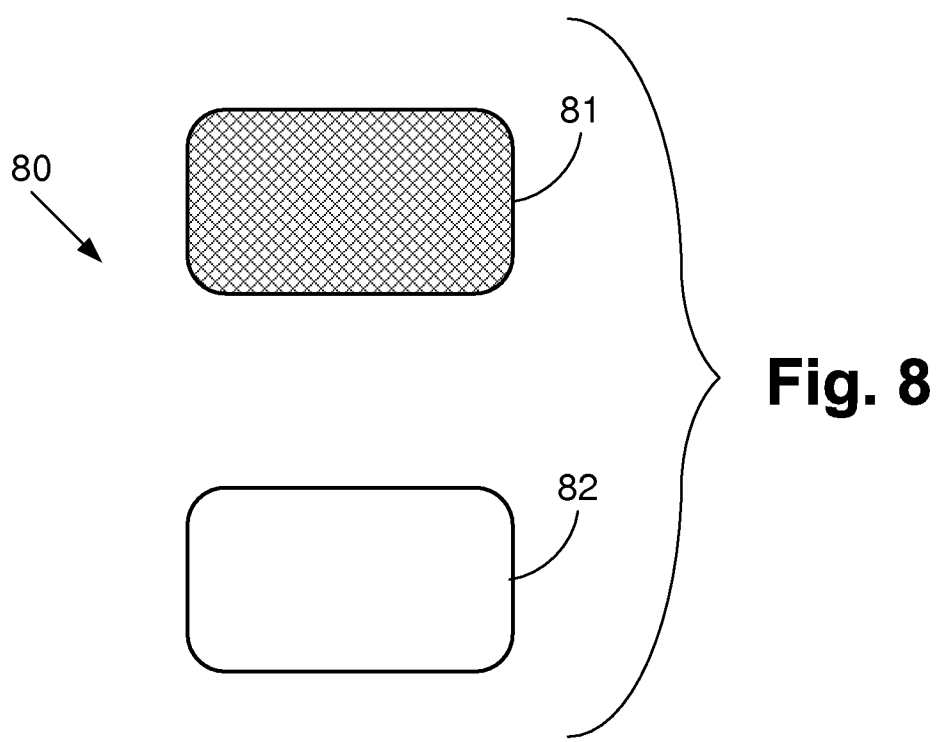
FIG. 8 illustrates the visual appearance of an example user interface control element in its different states.

FIG. 8 provides an example of a simple two state button control 80 shown in its different states—the normal (up) state 81, and the down state 82. In the button example, the normal state 81 is dark coloured and the down state 82 is lightly coloured, and are displayable upon the display 114 as an individual GUI or as part of a larger GUI. Selection of the button 80 may be via user positioning of a cursor associated with the mouse pointer 103 and clicking one of the mechanical buttons 103a or 103b associated with the mouse pointer 103, or via user operation of the keyboard 102 by various key presses.

Figure 5A:
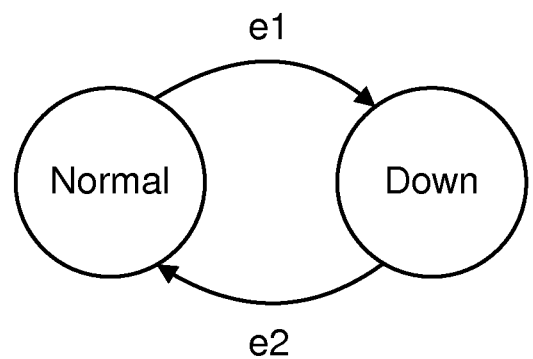
FIGS. 5(a) and 5(b) show the state-machine for an example button control and a corresponding animation map, respectively.

Once the desired states of the control 80 have been identified, the behaviour of the control 80 is modelled using a state-machine. The state-machine will have triggers (state change events) that are mapped to user-interface events (such as mouse clicks, key presses, etc). FIG. 5(a) shows a state-machine for the above mentioned example GUI button 80. The state-machine has state-change events e1 and e2, where e1 is mapped to a mouse down event, and e2 is mapped to a mouse up event. The chosen state machine models how the button control 80 will operate. The example button 80 will change from normal to down state whenever a mouse down click event (ie. depression of the mechanical button) occurs and changes from down to normal when a mouse up click event (ie. release of the mechanical button) occurs.

Figure 4:
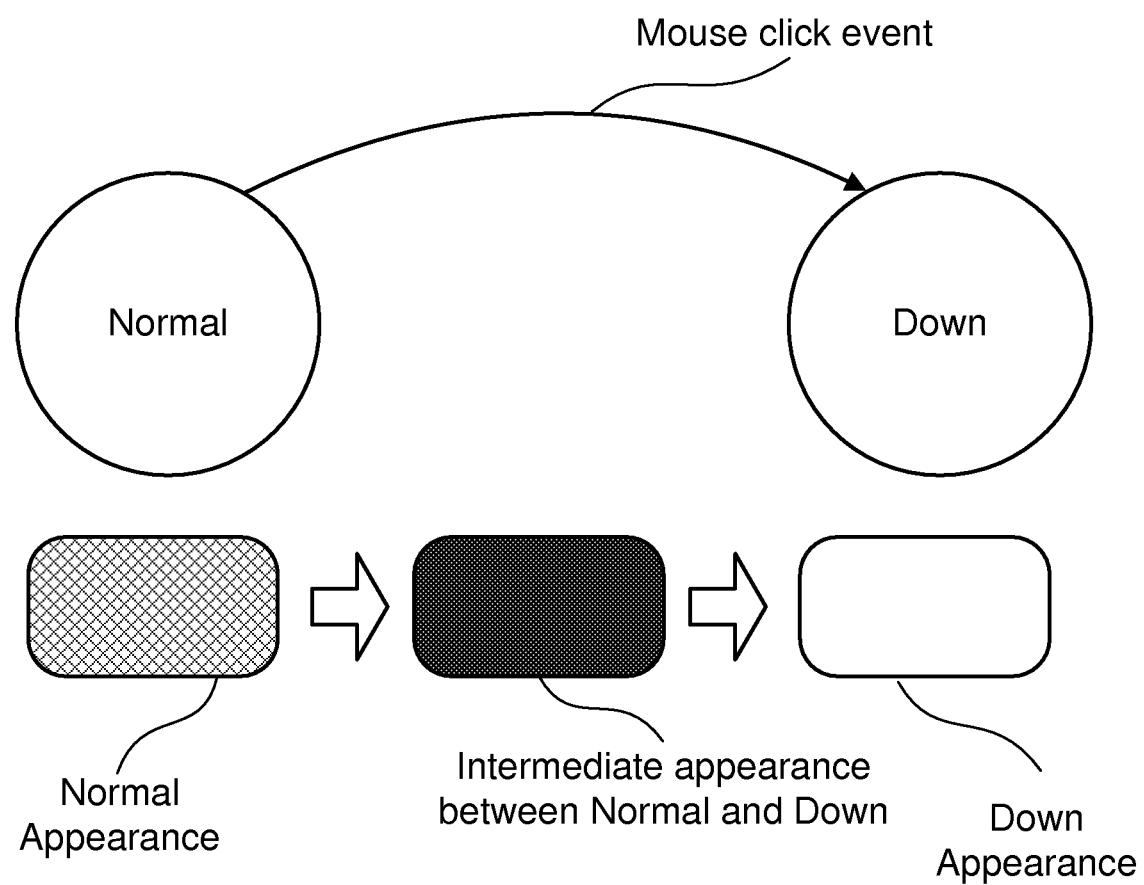
FIG. 4 is a diagram illustrating an example animation and an associated state transition.
Figure 5B:
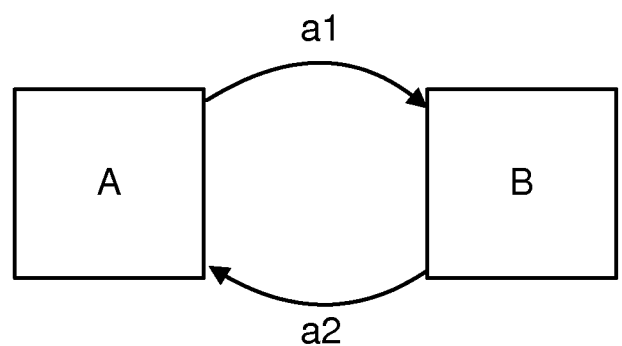

Once the state-machine is defined, the visual appearances of the control are then associated to each state of the state-machine. Transition animations are additionally defined between the appearances. The transition animations define how and what animation is to be performed. The transition animation in the preferred embodiment of the present invention is a morphing effect between appearances associated with each of the states of the state machine. The transition animation can also be a sequence or set of displayed transition images, a sound that is played or a command that is executed. In FIG. 4, the Normal appearance is associated with the Normal state of the state-machine and the Down appearance is associated with the Down state of the state-machine. An animation effect is defined, morphing from the Normal appearance to a dark colour then to the Down appearance. Collectively, these transition animations between appearances form what are called herein an animation graph. FIG. 5(b) shows an example animation graph for the button example, having appearances A and B, with transition animation a1 defined from appearance A to appearance B, and with transition animation a2 defined from appearance B to appearance A.

When running or otherwise executing the user-interface, the animation of the control will follow the paths on the animation graph. Multiple animations can be defined between two particular states, and each transition animation will have an associated event so that the different animations can be triggered based on the incoming event.

Whenever an input event occurs, a state change in the state-machine will be invoked. Such state changes will occur immediately and are processed when the input is received. Once the state of the state-machine has changed, the animation is directed to follow a path in the animation graph. In a preferred implementation, a state graph can be produced that is based on the state-machine and the animation graph that will allow for managing of transition animations for the control. The state graph is constructed such that each node or entry in the graph represents a particular combination of state of the animation graph and the state of the state-machine. The state graph contains nodes for all possible combinations that the animation graph and the state-machine can be in, and nodes that represent the situations when animations are occurring and when animations have stopped. Since the state-machine can change states independently of the animation, it can be observed that for each animation that is defined in the animation graph, the state-machine during each animation can be in any of its states. So if there was a state-machine with "n" states and a corresponding animation graph with "m" animations defined, then the state-machine of the control and the animation graph of the control can be in total "n*m" states. In addition to animating states, it is also observed that there will be "n" non-animating states. We can determine from this that the state graph produced will have at least "n*m+n" states.

Figure 6:
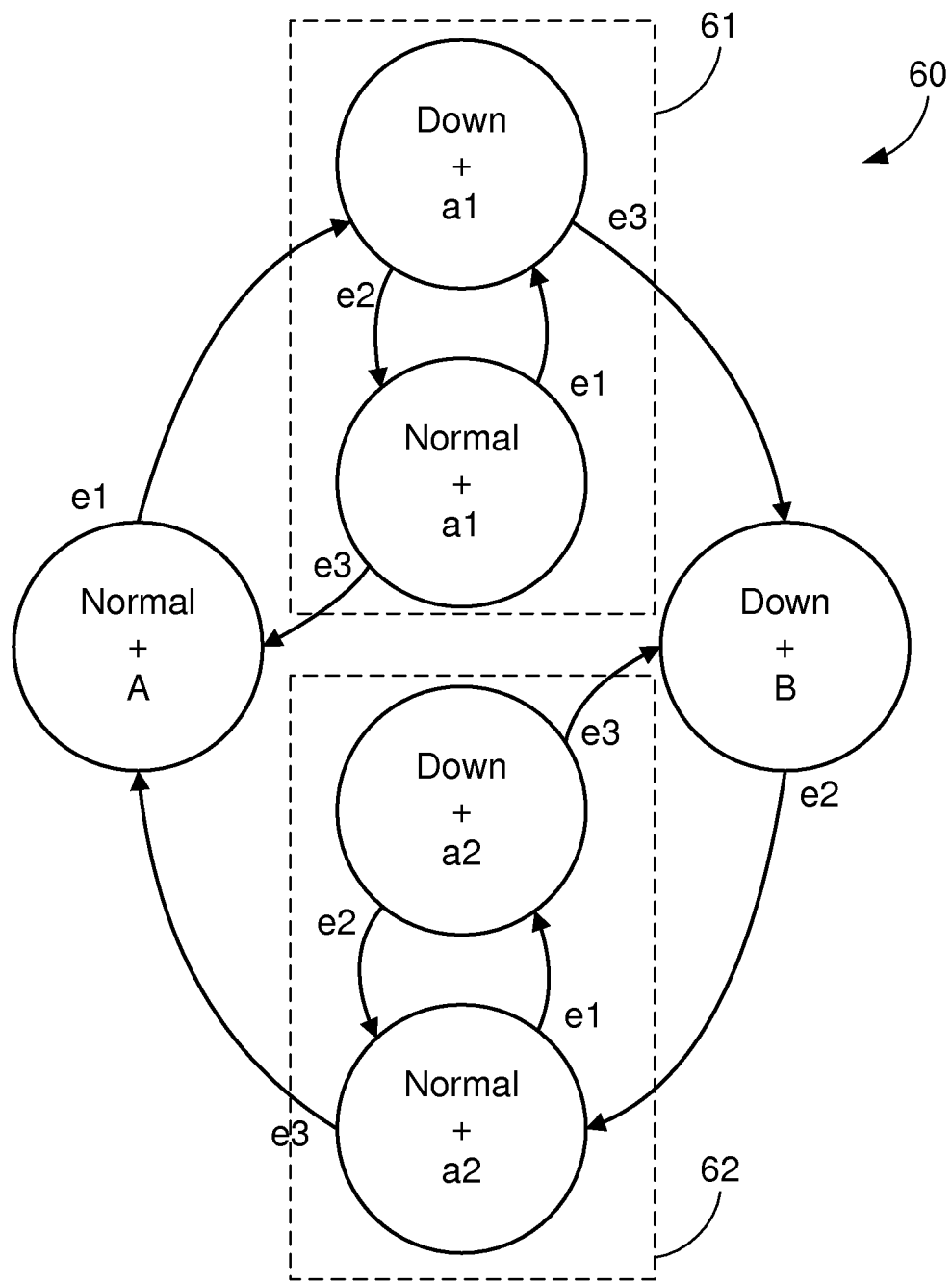
FIG. 6 is a diagram of the state map used for storing information to process events and schedule animations.

FIG. 6 illustrates a state graph 60 that is produced to model the two state button example discussed above. In the state graph 60, there are nodes or entries which represent each combination of the states (Normal and Over) in the state-machine with the animations that are present in the animation graph (a1 and a2), to form nodes with labels "Normal+a1", "Normal+a2", "Down+a1" and "Down+a2". Other than the nodes representing the animating states, non-animating states exist which correspond to the visual appearance of the control, which represents the control in a non-animating state and is displayed in the appearance associated with the current state. Such nodes have labels "Normal+A" and "Normal+B". In total, there are six nodes in this graph (ie. 2*2+2). The interconnections between the nodes in the graph correspond to the state change events found in the original state-machine (FIG. 5(a)). For each state graph derived for each animation in the animation graph of the control, the nodes are interconnected just as it was in the state-machine, as represented by the grouped nodes 61 and 62, respectively. For the remaining nodes which represent non-animating states, a connection is made to represent a change from non-animating to an animating state. Since the non-animating nodes represent some state of the state-machine of the control 80, the non-animating nodes will have outgoing state changes when an event is raised. The non-animating nodes are then connected to an animating node based on the state that the non-animating node is representing, and to a node which corresponds to the destination state and the resultant animation to render for the control. In the example illustrated in FIG. 6, the node "Normal+A" is connected to "Down+a1" since the state-machine has a transition from state Normal to state Down caused by event e1 and there exists a transition animation from appearance A to B (with which is associated with states Normal and Down respectively) with definitional. Then to model the situation when animations reach a non-animation state, an additional event (e3) is added which represents the end of animation event.

Figure 7:
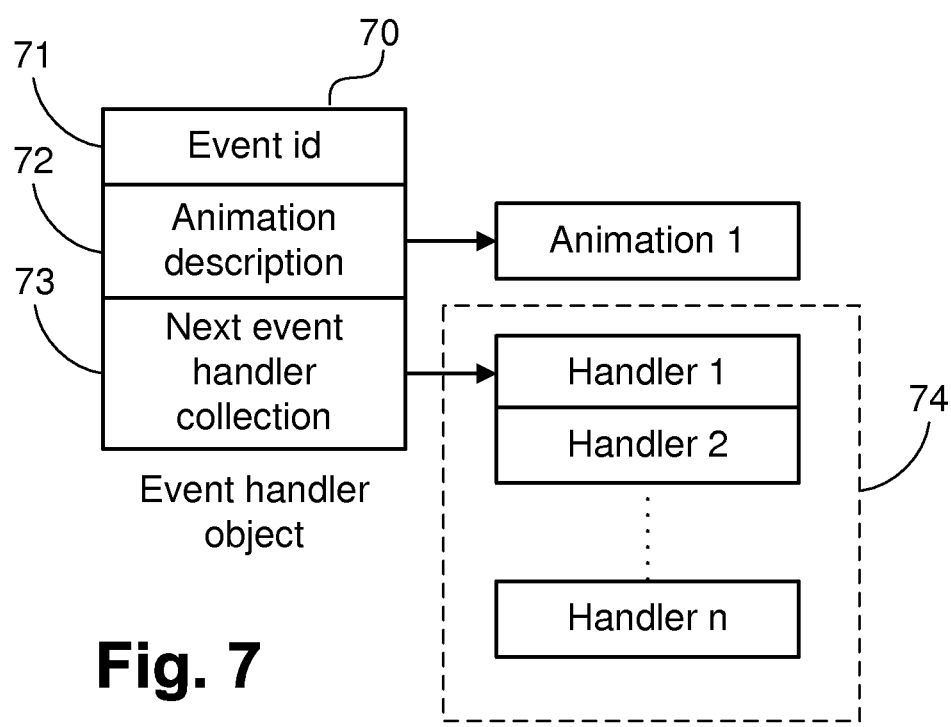
FIG. 7 is a diagram illustrating the contents that make up an event handler object.

The contents of each node, which represent some state of the animation and state-machine, will contain a collection of event handler objects 70, which is illustrated in FIG. 7. Each event handler object 70 has an associated event id 71, an animation description 72, and a reference to another node in the state graph 73 (which in this case contains a collection 74 of more event handler objects 70). In the animation runtime, only one state graph node is active where each node represents the current state of the state graph.

Figure 3:
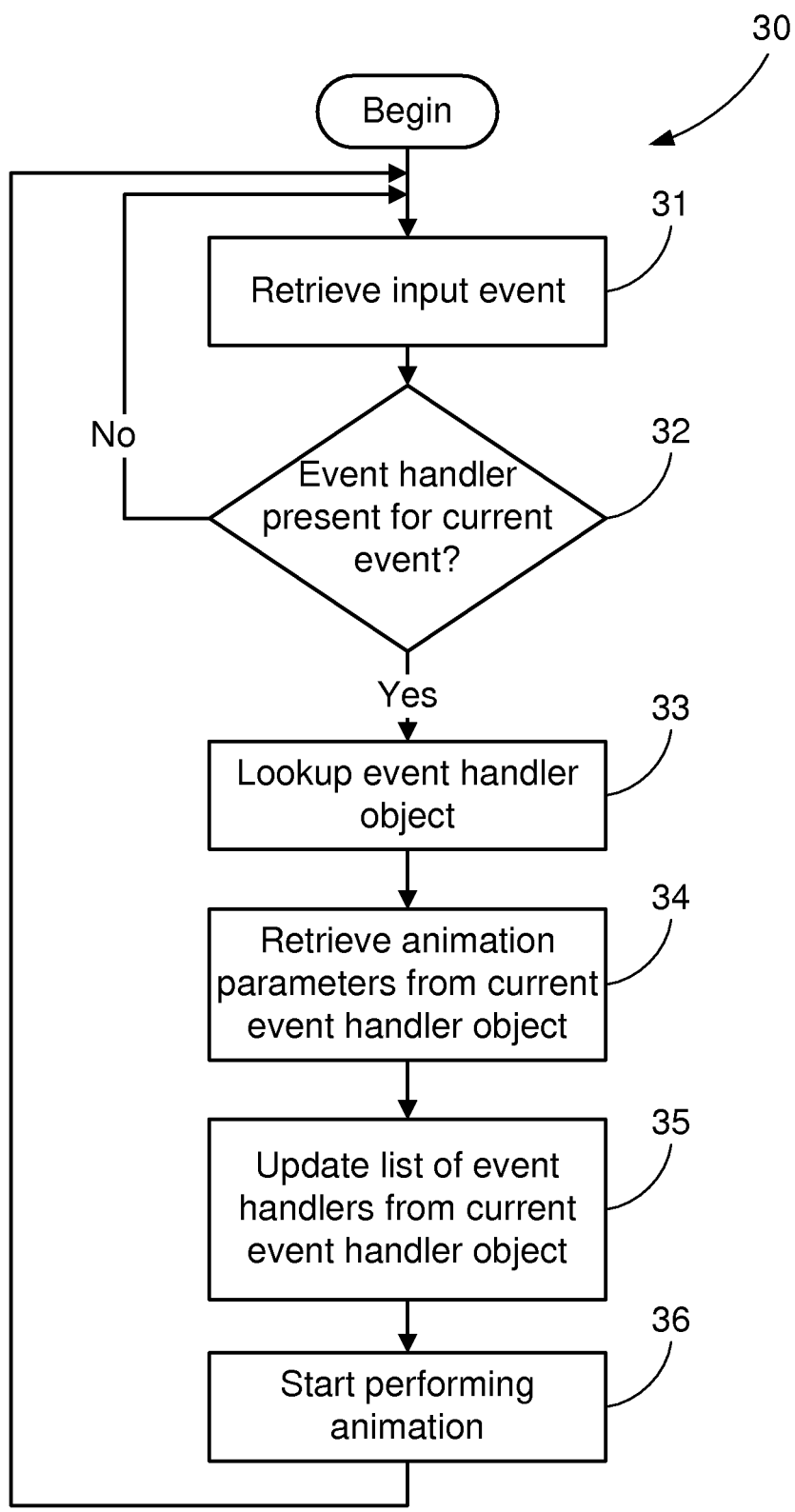
FIG. 3 is a flowchart of an exemplary event processing according to the present disclosure.

FIG. 3 shows a process 30 for event discrimination and scheduling of animations. The process 30 is typically represented as computer program code and stored in the HDD 110 and executed by the processor 105. When an incoming event occurs, such as a mouse click, the processor 105 detects this via the interface 113 and an input event is retrieved at step 31. Using the current event, which initially is the input event, the current list of event handler objects (in the current node of the state graph) are tested, at step 32, to see if an object corresponding to the current incoming "event id" is present. If there exists an event handler object for the current event (ie. yes in step 32), then that object is retrieved at step 33. Using the retrieved current event handler object, the corresponding animation description is then retrieved at step 34 which provides information on how and what animation to perform. The active list of event handler objects is then updated to refer to the list of event handler objects 74 in the current node object 70 of the state graph in step 35, which would later be used for processing subsequent events for the control. As may be appreciated from FIG. 7, each event handler object 70 may point to its own (unique) collection 74 of handler objects. Steps 32-35 collectively provided for evaluation of the graph associated with control element to identify a graph entry node specifying a transition from a current displayed first state invoked by the input event to the destination state, being the second control state for the widget. Then, in step 36 the animation is initiated using the retrieved animation description. Once this is performed, the process 30 then returns to step 31 to continue to process more events.

Figure 9:
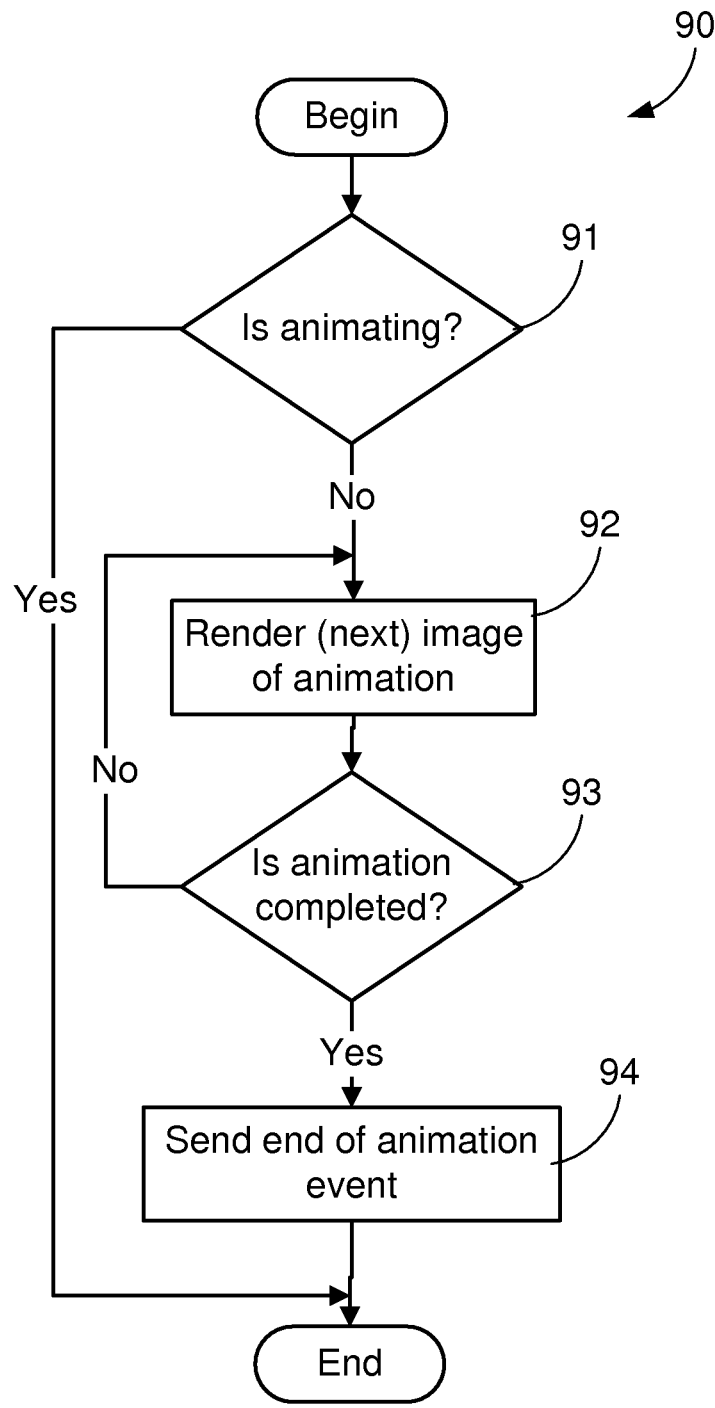
FIG. 9 is a flowchart of the logic of the inner rendering loop that can be used to provide updates of the animation appearance.

Once the animation has been initiated, the animation will occur with the processor 105 rendering images of the animation at regular intervals upon the display 114. FIG. 9 illustrates the logic for the render loop for the control. During the processing of an incoming event, an animation would be initiated if an event handler object with animation description were present. Before rendering images, a check is performed at step 91 to determine if the control is animating, due to processing of a prior event. If the control is still performing the transition animation caused by a prior event, then the method 90 ends. If there is no animation, the next image of the current animation is rendered at step 92. A test is then performed at step 93 to determine if the animation has completed. If the animation has finished rendering all images of the transition animation, then an end of animation event is sent at step 94 that is handled by the event discrimination logic, as is shown in FIG. 3. If the animation has not completed, (ie. no, from step 93) then control returns to step 92. In FIG. 6, the end of animation event (step 94) is shown as the event e3.

While the control's transition animation is rendered using the steps illustrated in the flowchart in FIG. 9, the transition animation would be rendered, from the first associated appearance, to the second appearance associated with the first and second control states respectively for the transition animation. When an event is received while the control is animating, the event will continue to be processed by the steps illustrated in the flowchart in FIG. 3, causing the control state of the control to be changed while the previous animation is rendered. This results in a situation where the final rendered appearance of the control, after completion of the animation, does not match the control state of the widget. The end of animation event, generated when animation is completed at step 94 and processed by the widget's event processing logic in FIG. 3, is then used to cause the widget to start the next animation. The next animation will eventually render the control in an appearance corresponding to the widget's current control state.

It should be noted that while the steps for rendering the animation for the control is presented in the steps illustrated in the flowchart in FIG. 9, the process of rendering can occur in a separate User Interface thread, which responsible is responsible for the updating of the appearance of the control. The steps illustrated in the flowchart in FIG. 3, would continue to be processed even while the control is animating.

The end of animation event is processed similarly like other events, keeping the animation from continuing when multiple state changes occur. Subsequent transition animations, triggered by an end of animation event, causes the widget to be rendered at an appearance which is not synchronised with the present control state of the widget. Additional animations will result causing the control to continually animate, even when there is no direct transition animation from the state representing the current visual appearance to the control state of the control. Each node in the animation graph would represent either an animating state or a non-animating state, all animating nodes need to have an event to cause the node to switch to the next state in the animation—this is reason for the existence of the end of animation event. The end of animation event allows for multiple subsequent animation definitions to be processed and allows for the control to be continually animating, until a non-animating node in the state graph is reached.

In the above described method for managing animations for control elements, additional animations can be defined between two states, each with a different event identifier (id). This will allow the control element to use different transition animations depending on the incoming event, even when the different event causes the same state transition of the control states to occur. That is, there can be different animations for the scenario when a button control is clicked from the mouse 103, and a different animation for when the control is accessed using key presses from the keyboard 102. In both scenarios, the underlying state-machine for the control will be the same, changing from the Normal state to the Down state, but different animations would be rendered.

Using the arrangements presently disclosed, any change of state of the control element is de-coupled from the reproduction of any corresponding animated transition. As such, where the change of state occurs whilst the control is in a non-animating display state, both the state change and the transition will appear substantially synchronized. Where however a rate of state change exceeds the reproduction rate of the animated transition(s), the changes in state will nevertheless occur, causing the control state of the control to change, and are actioned as control events within the GUI. As the state change occurs whilst the control is in an animating state, subsequent end of animation events will cause the control to continue animating, until a valid traversal within the state graph is achieved, causing the control to be rendered in one of the control's non-animated display state. According to FIGS. 3 and 9 the current transition animation is completed before any subsequent transition animation is commenced. It may therefore follow that the conclusion of animated transitions can (visibly) lag during changes of state, but nevertheless result in smooth transitions being reproduced in the GUI In such an arrangements, state changes of the controls are always rendered with smooth animations, using animations that are defined by the user, in a manner which attempts to minimise the amount lag of the rendering of the control.

INDUSTRIAL APPLICABILITY

The arrangements described are applicable to the computer and data processing industries and particularly for the display of GUIs in computer systems.

The foregoing describes only some embodiments of the present invention, and modifications and/or changes can be made thereto without departing from the scope and spirit of the invention, the embodiments being illustrative and not restrictive.

What is claimed is:

1. A method for providing an animated transition effect between a first state of a control element rendered on a graphical user interface of a computer system and a second state of the control element, the method comprising:
produce a state graph for the control element, the state graph including:
first type nodes, each representing a combination of the first state or the second state and an appearance;
second type nodes, each representing a combination of the first state or the second state and an animation, wherein second type nodes having matching animations with different states are grouped; and
interconnections between the first type nodes and the second type nodes or between the second type nodes, each of the interconnections corresponding to a state change event;
rendering the control element in the first state;
receiving, at the graphical user interface, a user input event to invoke the second state of the control element;
identifying a node specifying a transition invoked by the user input event from a current displayed first state to a destination state, being the second state, by evaluating one of the state graphs associated with the control element; and
rendering an animation corresponding to the transition.

2. A method according to claim 1, wherein associated with each control state is a corresponding animation node, the animation node forming part of an animation description.

3. A method according to claim 1, wherein a state graph is formed by event handler objects, each of the event handler objects including an identification of a corresponding event, an animation description, and a link to at least one event handler object for a corresponding subsequent event.

4. A method according to claim 3, wherein the link is to a collection of event handler objects, which includes the at least one event handler object.

5. A method according to claim 1, wherein the rendering of the animation corresponding to the transition is completed before an animation for a subsequent transition is commenced.

6. A method according to claim 5, wherein the rendering of an animation corresponding to the transition includes:
(i) rendering an image of the animation;
(ii) testing to determine if all images of the animation have been rendered and that the animation is complete;
(iii) if the animation is not complete, repeating the (i) rendering and (ii) testing steps; and,
(iv) if the animation is complete, generating an end of animation event.

7. A method according to claim 1, wherein the receiving step includes updating a list of events with each change of state, and the rendering of the animation includes rendering in order each associated animation of a corresponding change of state.

8. A method according to claim 7 wherein, where processing of a further state change event occurs before a current transition animation for a control has completed rendering, an end of animation event is generated at an end of a current transition animation, which causes an animation corresponding to the further state change event to be processed after the current transition animation has completed.

9. A non-transitory computer readable storage medium having a computer program recorded thereon, the program being executable by a computer apparatus to provide an animated transition effect between a first state of a control element rendered on a graphical user interface of a computer system and a second state of the control element, the program comprising:
　　code for producing a state graph for the control element, the state graph including:
　　　　first type nodes, each representing a combination of the first state or the second state and an appearance;
　　　　second type nodes, each representing a combination of the first state or the second state and an animation, wherein second type nodes having matching animations with different states are grouped; and
　　　　interconnections between the first type nodes and the second type nodes or between the second type nodes, each of the interconnections corresponding to a state change event;
　　code for rendering on a display device associated with the computer apparatus the control element in the first state;
　　code for receiving, at the graphical user interface, a user input event to invoke the second state of the control element;
　　code for identifying a node specifying a transition invoked by the user input event from a current displayed first state to a destination state, being the second state, by evaluating one of the state graphs associated with the control element; and
　　code for rendering an animation corresponding to the transition.

10. A computer apparatus for providing an animated transition effect between a first state of a control element rendered on a graphical user interface of a computer system and a second state of the control element, the apparatus comprising a processor programmed to:
　　produce a state graph for the control element, the state graph including:
　　　　first type nodes, each representing a combination of the first state or the second state and an appearance;
　　　　second type nodes, each representing a combination of the first state or the second state and an animation, wherein second type nodes having matching animations with different states are grouped; and
　　　　interconnections between the first type nodes and the second type nodes or between second the type nodes, each of the interconnections corresponding to a state change event;
　　render the control element in the first state;
　　receive a user input event to invoke the second state of the control element;
　　identify a node specifying a transition invoked by the user input event from a current displayed first state to a destination state, being the second state, by evaluating one of the state graphs associated with the control element; and
　　render an animation corresponding to the transition.

* * * * *